(12) United States Patent
Zimmerman (10) Patent No.: US 6,816,129 B1
(45) Date of Patent: Nov. 9, 2004

(54) MULTIPLE DISPLAY DEVICE FOR USE WITH EXISTING PERSONAL COMPUTER SYSTEMS

(75) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,316

(22) Filed: Dec. 21, 1999

(51) Int. Cl.[7] .............................................. G09G 5/00
(52) U.S. Cl. ........................ 345/1.1; 345/2.1; 345/9; 345/520; 345/3.1; 340/2.1; 340/2.2; 340/825; 709/107; 709/108; 711/31; 711/131
(58) Field of Search .......................... 345/156, 1.1–1.3, 345/3.1, 520; 340/825, 2.1, 2.2, 2.24, 3.3; 709/107, 108; 711/31, 131; 348/383, 384, 423, 839, 840; 361/681, 679

(56) References Cited

U.S. PATENT DOCUMENTS

| | | | | |
|---|---|---|---|---|
| 4,800,376 A | * | 1/1989 | Suga et al. .................. | 345/1.3 |
| 4,965,559 A | * | 10/1990 | Dye ........................... | 345/2.2 |
| 5,374,940 A | | 12/1994 | Corio | |
| 5,515,491 A | | 5/1996 | Bates et al. | |
| 5,523,769 A | * | 6/1996 | Lauer et al. ................ | 345/1.3 |
| 5,590,264 A | | 12/1996 | Keane et al. | |
| 5,621,890 A | | 4/1997 | Notarianni et al. | |
| 5,699,534 A | | 12/1997 | Barber et al. | |
| 5,742,788 A | | 4/1998 | Priem et al. | |
| 5,748,866 A | | 5/1998 | Edgar | |
| 5,777,615 A | | 7/1998 | Barber et al. | |
| 5,784,035 A | * | 7/1998 | Hagiwara et al. ........... | 345/1.3 |
| 5,956,046 A | * | 9/1999 | Kehlet et al. ................ | 345/1.3 |
| 6,046,709 A | * | 4/2000 | Shelton et al. .............. | 345/1.1 |
| 6,104,414 A | * | 8/2000 | Odryna et al. .............. | 345/1.3 |
| 6,137,490 A | * | 10/2000 | Shishido ..................... | 345/690 |
| 6,262,695 B1 | * | 7/2001 | McGowan .................. | 345/1.1 |
| 6,297,785 B1 | * | 10/2001 | Sommer et al. ............. | 345/1.1 |
| 6,333,750 B1 | * | 12/2001 | Odryna et al. .............. | 345/1.1 |
| 6,344,836 B1 | * | 2/2002 | Suzuki ....................... | 345/1.2 |

FOREIGN PATENT DOCUMENTS

| | | |
|---|---|---|
| EP | 0 779 573 A1 | 6/1997 |
| JP | 09-274475 | * 10/1997 |
| WO | WO 93/08536 | 4/1993 |

OTHER PUBLICATIONS

Halle, M. Abstract.
JP9330202, Dec. 22, 1997, Japanese Abstract.

* cited by examiner

*Primary Examiner*—Henry N. Tran
(74) *Attorney, Agent, or Firm*—Gates & Cooper LLP (57) ABSTRACT

A method and apparatus for adapting a single computer to drive at least two displays is disclosed. In one embodiment, an apparatus for adapting a single computer to drive at least two displays is disclosed. The apparatus comprises a controller, coupled between a user input device such as a computer, the controller for providing a control signal according to a user input; and a video switcher, for selectively providing a signal from the computer to one of at least two video displays in response to the control signal. In another embodiment, a method of presenting information on at least two displays communicatively coupled to a computer is disclosed. The method comprises the steps of intercepting a user input to the computer, and directing a video output signal from the computer to one of at least two video displays according to the intercepted video input.

23 Claims, 6 Drawing Sheets

PRIOR ART

MULTIPLE DISPLAY DEVICE FOR USE WITH EXISTING PERSONAL COMPUTER SYSTEMS

BACKGROUND OF THE INVENTION

1. Field of the Invention

The present invention relates to systems and methods of presenting information generated on a computer to a user, and in particular to a method and apparatus for modifying an existing personal computer to operate with multiple displays.

2. Description of the Related Art

Most currently available computers are capable of operating in a multitasking environment. This allows the user to have several applications (e.g. a word processor, spreadsheet, browser, and e-mail program) open at the same time. Such computers are also capable of displaying multiple windows (typically, one for each application) on a single display. However, although such multi-window interfaces, (such as those provided by the WINDOWS NT, and WINDOWS '98 operating systems) are useful, they can require large, expensive displays.

At the same time, the cost of displays, particularly liquid crystal displays (LCDs), is decreasing. This makes it possible to implement multiple displays, rather than a single display presenting multiple windows mounted, for example, in a desktop space.

Attempts have been made at using single computers to drive multiple displays. For example, European Patent Disclosure EP 0 779 573 A1 discloses the construction of a new personal computer (PC) having a plurality of cathode ray tube (CRT) controllers sharing the same display memory connected to a control unit by a bus. Although this system permits the use of a single computer to drive multiple displays, it requires the user to purchase a new unique PC, and cannot be used to modify existing PCs to drive multiple displays. Essentially, the system in this disclosure requires replacement of the entire system to provide multiple display capability. Further, the foregoing system does not provide an easy mechanism to increase the number of displays, since it requires special software running on the control unit to route display information to the CRTs.

What is needed is a system and method that allows currently available personal computers to be easily modified to provide multiple display capability. The present invention satisfies that need.

SUMMARY OF THE INVENTION

To address the requirements described above, the present invention discloses a method and apparatus for adapting a single computer to drive at least two displays.

The present invention is embodied in an apparatus for adapting a single computer to drive at least two displays. The apparatus comprises a controller, coupled between a user input device and a computer, the controller for providing a control signal according to a user input; and a video switcher, for selectively providing a signal from the computer to one of at least two video displays in response to the control signal.

The present invention is also embodied in a method of presenting information on at least two displays communicatively coupled to a computer. The method comprises the steps of intercepting a user input to the computer, and directing a video output signal from the computer to one of at least two video displays according to the intercepted video input.

The foregoing allows the use of multiple displays with a single ordinary computer without the disadvantages described above. The foregoing invention also allows each application to occupy a display. Only one application is active at a time; the application the user is interacting with by keyboard or by a mouse. The display of the active application is animated, all the other displays show a frozen image (using a RAM frame buffer). Hence, one PC is used to feed "live images" to an active display, and frame buffers are used to show frozen images on the inactive displays.

For example, a user writing a paper may have a word processor, a spreadsheet, Web page, and a reference paper active, with each presented on its own separate display (four displays). When the user is writing with the word processor, the word processor display is active and the rest would be inactive. The inactive displays would show the spreadsheet, Web page, and reference paper. When the user moves the mouse to the reference paper, the word processor display becomes an inactive display, and the word processor freezes the image on the page they are working on. To the user, it is as if all of the applications are running simultaneously since the users interact with only one application at a time.

Unlike the prior art described above, the present invention receives video from a conventional unmodified PC, taking advantage of the commodity market of existing PCs and can use the user's existing PC. Further, the present invention allows the user to freely upgrade their PC without rendering the multiple display capability as obsolete.

The present invention also uses the primary display (typically the one in front of the user) as the active display. The systems disclosed in the prior art change the brightness of the display to indicate which is the active display. This can be visually annoying, since the user will be viewing all displays, even the dimmed displays. This confusion is avoided by the present invention, since only primary display (typically the one in front of the user) is active, and any secondary displays show only frozen images.

The present invention also allows the user to add additional displays as required by simple modification or replacement of the custom box. Prior art solutions require a new custom PC to be purchased or accessories to be added inside the custom PC. Conversely, the present invention uses a custom box that is external and independent of the customer's "off the shelf" PC. Several custom boxes, supporting a variety of display resolutions and capacities can be provided by the invention.

The present invention also does not require any changes to the PC software. The present invention intercepts keyboard and mouse actions and passes them through to the PC. By intercepting these controllers, the video from the PC can be routed to the auxiliary displays by user control, without requiring special action of the PC.

The present invention also allows the user to program a sequence of keyboard and mouse input and play it back in a repeating loop. This allows one PC to perform the function of many. For example, a stock broker can have six screens connected to one PC using the invention, each one showing the trading values of a particular stock. The invention would sequentially update each screen, providing the effect of having six computers.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
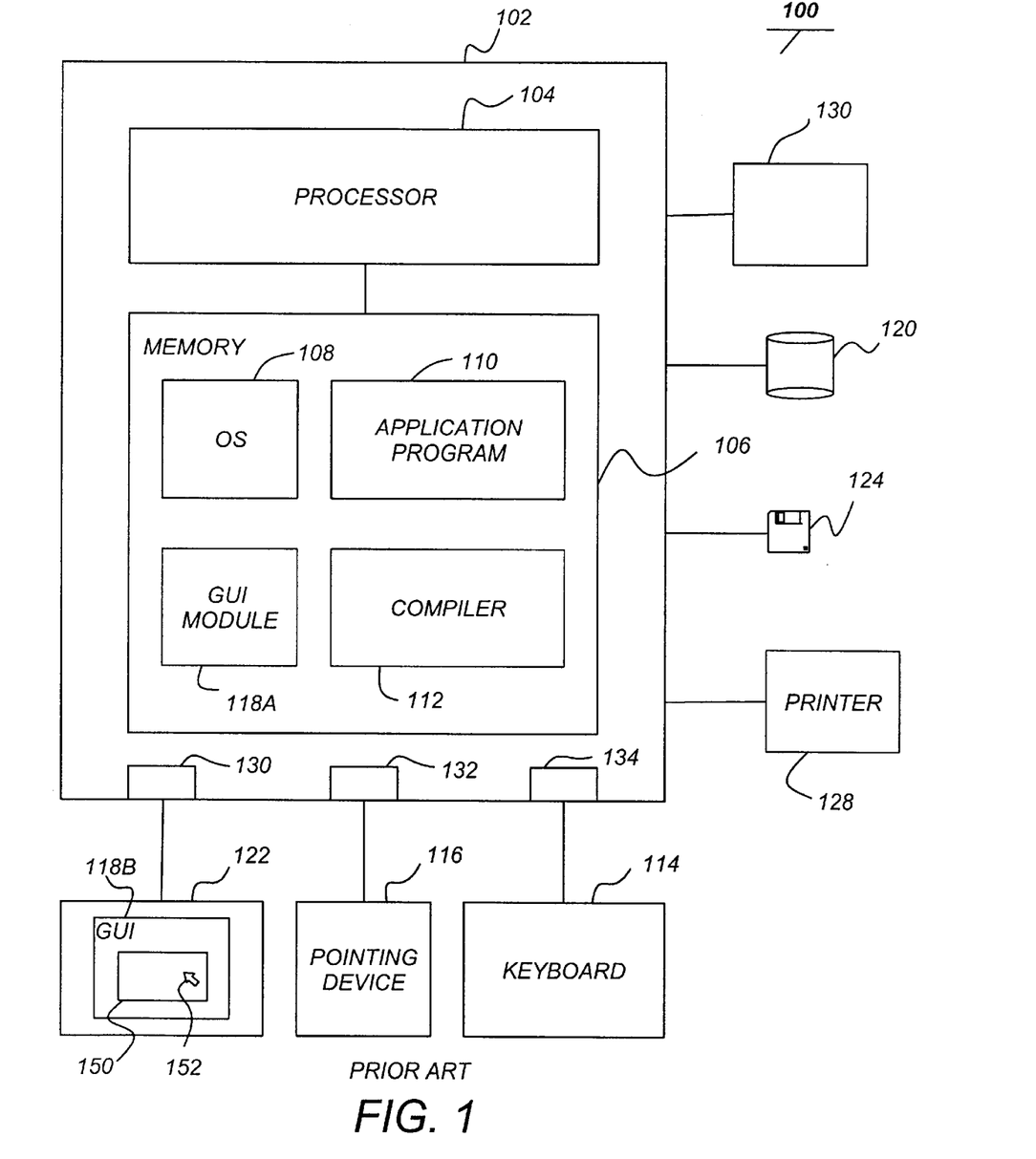
FIG. 1 is a block diagram showing an exemplary conventional personal computer (PC)

FIG. 1 illustrates an exemplary computer system 100 that could be used to implement the present invention. The computer system includes a computer 102 such as a personal computer (PC) 102 is operatively coupled to a display 122, which presents images such as windows to the user on a graphical user interface 118B. The GUI 118B provides a display space in which an annunicator 152 may be located. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102. The keyboard 114 is coupled to the computer 102 via a keyboard input port 134, the pointing device 116 is coupled to the computer 102 via a pointing device input port 132, and the display 122 is coupled to the computer via a display port 130 such as a VGA port.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in the memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
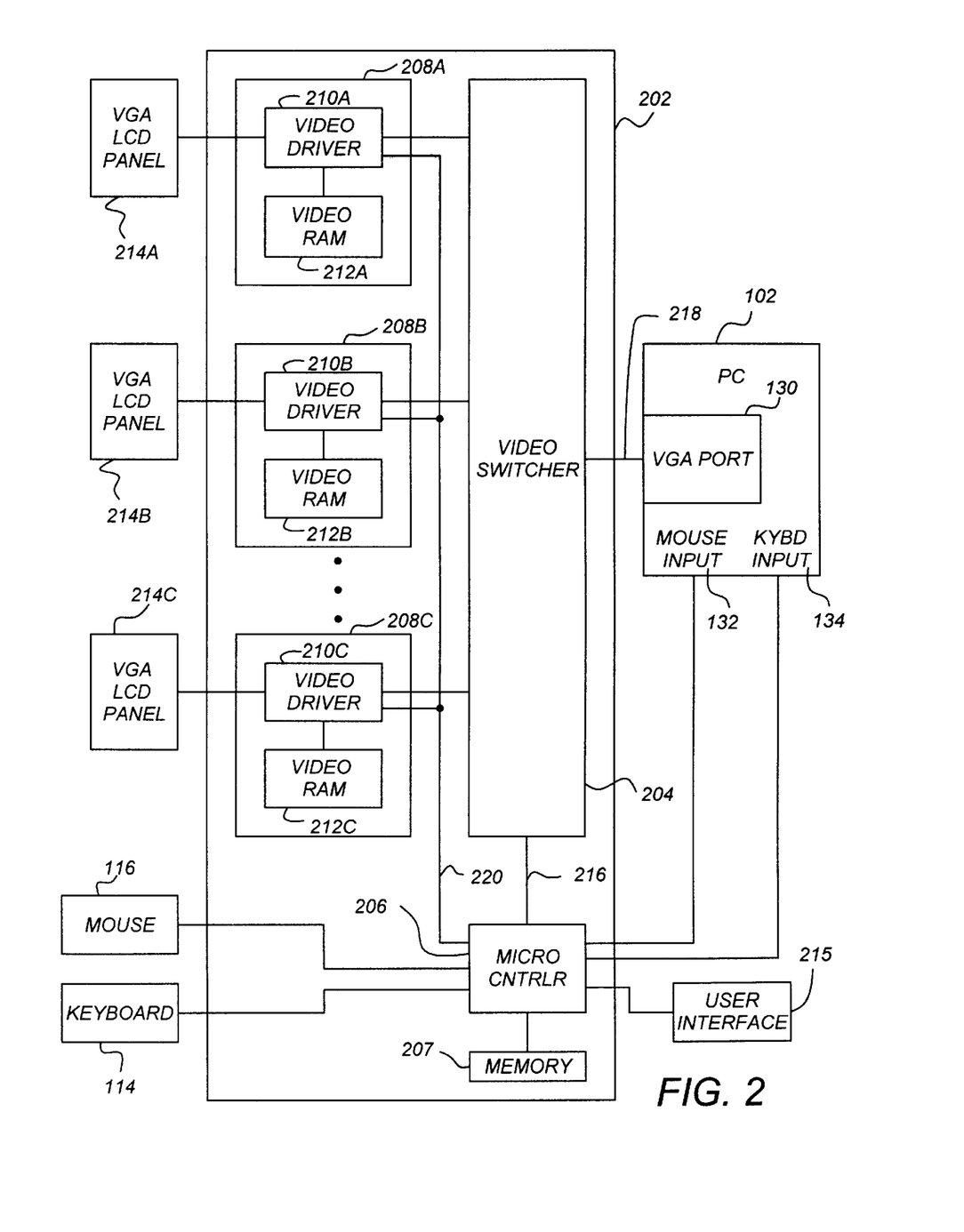
FIG. 2 is a diagram showing the operation and interrelationships between elements of a multiple display adapter.

FIG. 2 is a diagram showing the operation and interrelationships between elements of a multiple display adapter (MDA) 202, which can be used to practice the present invention. The MDA 202 is coupled between input devices (such as the mouse 116 and the keyboard 114), output devices (such as the display panels 214A–214C) and the PC 102.

Signals reflecting user input to the mouse 116 and keyboard 114 are provided to a communicatively coupled microcontroller 206 in the MDA 202. The microcontroller 206 passes the input signals along to the PC at the mouse input 132 and the keyboard input 134. The microcontroller 206 also provides a control signal 216 to a video switcher 204. The control signal 216 is generated from the user input to the mouse 116 and/or the keyboard 114, and provides information to the video switcher 204 indicating which display should be activated and when. The control signal 216 can be stored in memory 207 connected to the microcontroller 206 and sent to the video switcher 204 (hereinafter referred to as Record Sequence), to automatically execute a sequence of mouse 116 and/or keyboard 114 input without further input from the user (hereinafter referred to as a Repeat Sequence). Based on the control signal 216 from the microcontroller 206, the video switcher 204 selectively provides the video content signal 218 from the VGA port 130 of the PC 102 to one of the video modules 208A, 208B, and 208C (hereinafter collectively referred to as video modules 108).

The video modules 208 each include a video memory 212 for storing video data, and a driver 210. Each driver 210 is communicatively coupled to the microcontroller 206, and the video memory 212 and one of the display panels 214. Each driver 210 drives its associated intercoupled video display 214 to present images to the user. Using a driver control signal 220 provided by microcontroller 206, the driver 210 selects the data to provide to the display from either the switched video content signal 218 provided from the video switcher 204 or the video memory 212. Also, when an active image is deactivated in response to the driver control signal 220 from the microcontroller 206, the driver 210 transfers the data from the active image to the video RAM 212, where it is stored. This data is subsequently used by the driver 210 to present data on its associated display 214 to show an inactive window. Typically, the interactive window is "frozen" in that it remains unchanged. Hence, the video stream is displayed "live" on one of the displays 214 (e.g. a primary display such as display 214A), and the remainder of the displays (e.g. secondary displays such as 214BV and 214C) are using the data stored in the video RAMs (212B and 212C, respectively) to play back a frozen signal image.

The user can select the active display in many ways. In one method, this is accomplished in accordance with the position of a cursor, arrow, or other annunciator that is movable to different display space locations via suitable input to the mouse 116 or keyboard 114. Hence, if the annunciator is in a display space which is to be presented by display panel 214A, that display is active, and hence the video switcher switches video data to the associated video module 208A, and the driver 210, provides the video data to the display panel 214A. When the annunciator is moved to a different display space so that it is within the area designated for a different display used to drive display 214A to a frozen inactive state, and the data from the video switcher 204 is provided to video driver 210B, and to display 214B. The foregoing has the effect of presenting a large mosaic display to the user. One advantage of this embodiment is that a number of smaller less expensive displays can be used to present a larger image to the user. In another embodiment, the active display is selected by a user interface 215, for example electrical buttons (not shown), provided on the front panel of the MDA 202.

In another embodiment, the active display is selected by the use of assigned keys on the keyboard 114. For example, the function keys (F8, F9, F10, F11, and F12) can be used to explicitly tell the microcontroller 206 and associated elements to perform the following operations:

TABLE I

| | |
|---|---|
| F8 | Record Sequence |
| F9 | Repeat Sequence |
| F10 | Deactivate current screen and activate another screen |
| F11 | Select which application shall be displayed in the current display |
| F12 | Move the current application to another display |

Figure 3A:
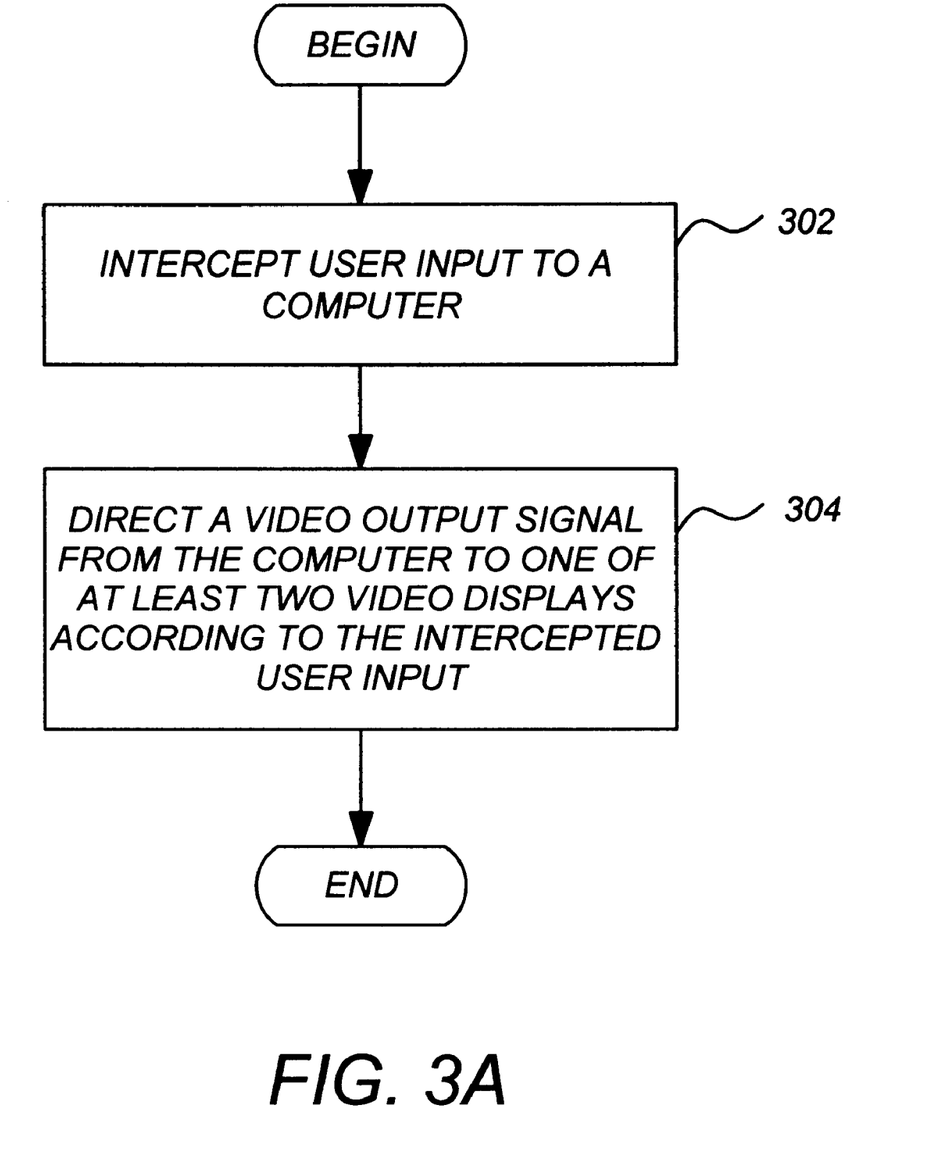
FIG. 3A is a flow chart describing exemplary method steps used to practice one embodiment of the present invention.

FIG. 3A is a flow chart describing exemplary method steps used to practice one embodiment of the present invention. First, a user input that is normally provided from a user input device to a computer 102 is intercepted 302. Then, as depicted in block 304, a video output signal such as the video content signal 218 is directed from the computer 102 to one of a least two displays 214 according to the intercepted user input.

Figure 3B:
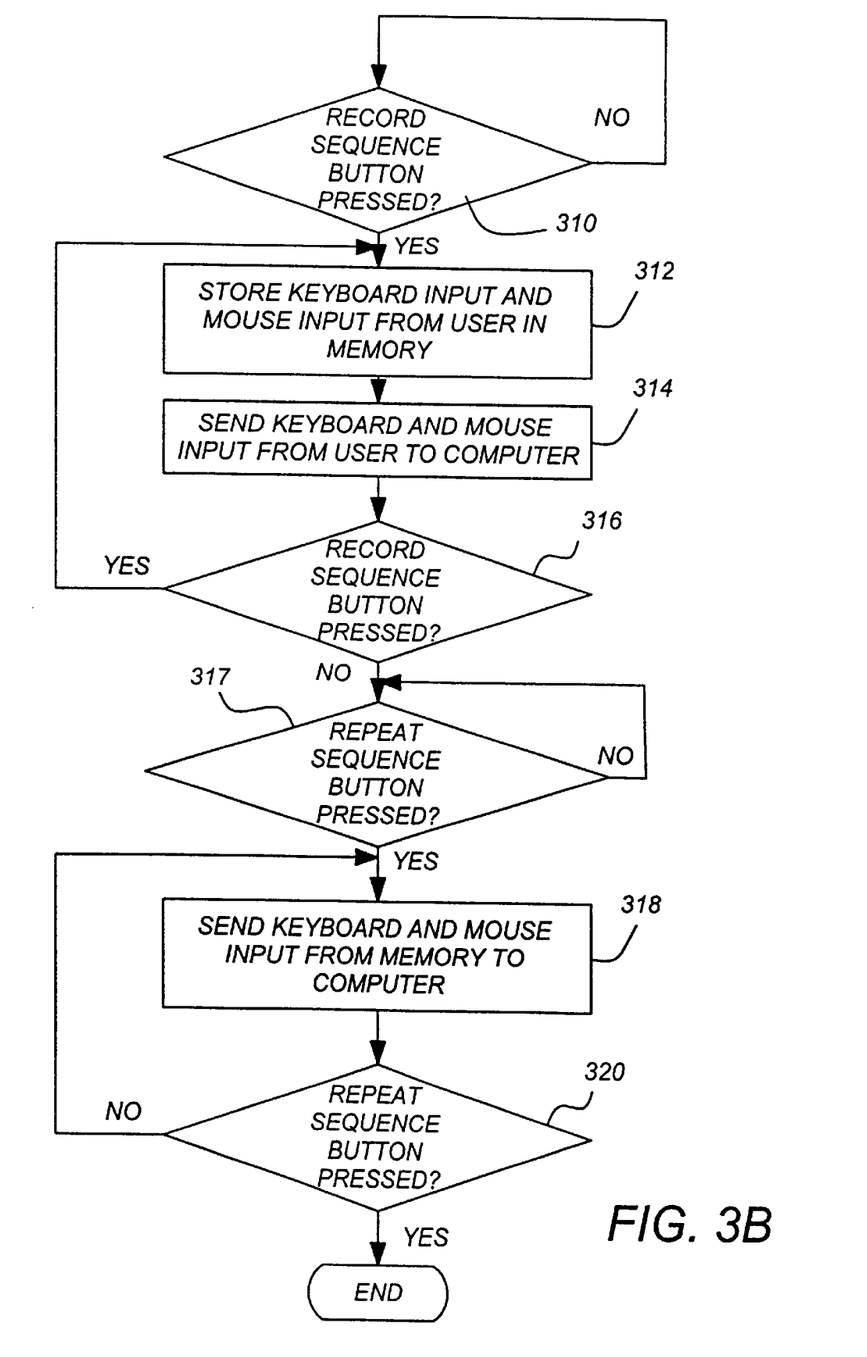
FIG. 3B is a flow chart describing exemplary method steps used to repeat a sequence of mouse and/or keyboard input.

FIG. 3B is a flow chart describing exemplary method steps used to record and repeat a sequence of mouse 116 and/or keyboard 114 input. The user presses the Record Sequence button (keyboard function key F8 in a preferred embodiment), shown in block 310. The microcontroller 206 stores all subsequent mouse 116 and keyboard 114 input in memory 207, depicted in block 312. Mouse 116 and keyboard 114 is simultaneously sent to the computer 102 mouse input 132 and keyboard 134 input, depicted in block 314, allowing the user to see the effect of their input on the video displays 214. Recording ceases when the Record Sequence button is pressed, shown in block 316. When the Repeat Sequence button (keyboard function key F9 in a preferred embodiment) is pressed, depicted in block 317, microcontroller 206 retrieves the input stored in memory 207 and sends the input sequence to the computer 102 mouse input 132 and keyboard 134 input, as shown in block 318. The input sequence is repeated until the Repeat Sequence button is pressed, as depicted in block 320.

A user can use the Record Sequence and Repeat Sequence to create a self-refreshing array of Web pages each presented individually on a video display 214. In a preferred embodiment of the invention, the user would assign a web browser (such as NAVIGATOR from the NETSCAPE CORPORATION) to each video display 214, as described in FIG. 4. The user would then teach the MDA 202 how to update each Browser running in each video display 214 by recording a sequence of mouse 116 and keyboard 114 input, as described in FIG. 3. Typically a Web page is updated by clicking on the "Reload" button in the Browser application using the mouse input 116. Once the user has taught the NDA 202 by example how to update each Web page, the user presses Record Sequence, indicating the training is complete. The time between the last mouse click and the pressing of the Record Sequence is also recorded by the microcontroller 206, allowing the user to program in a delay before the sequence is repeated. When the user presses Repeat Sequence, the mouse input 116 and keyboard input 114 previously preformed by the user are played back by the MDA 202 into the computer 102 mouse input 132 and keyboard input 134. The input causes the computer 102 to update each Web page. The MDA 202 directs the video content signal 218 to the video module 208 and video display 214 assigned by the user. The resulting effect is each video display 214 shows a Web page that is sequentially being updated by the computer 102.

Figure 4:
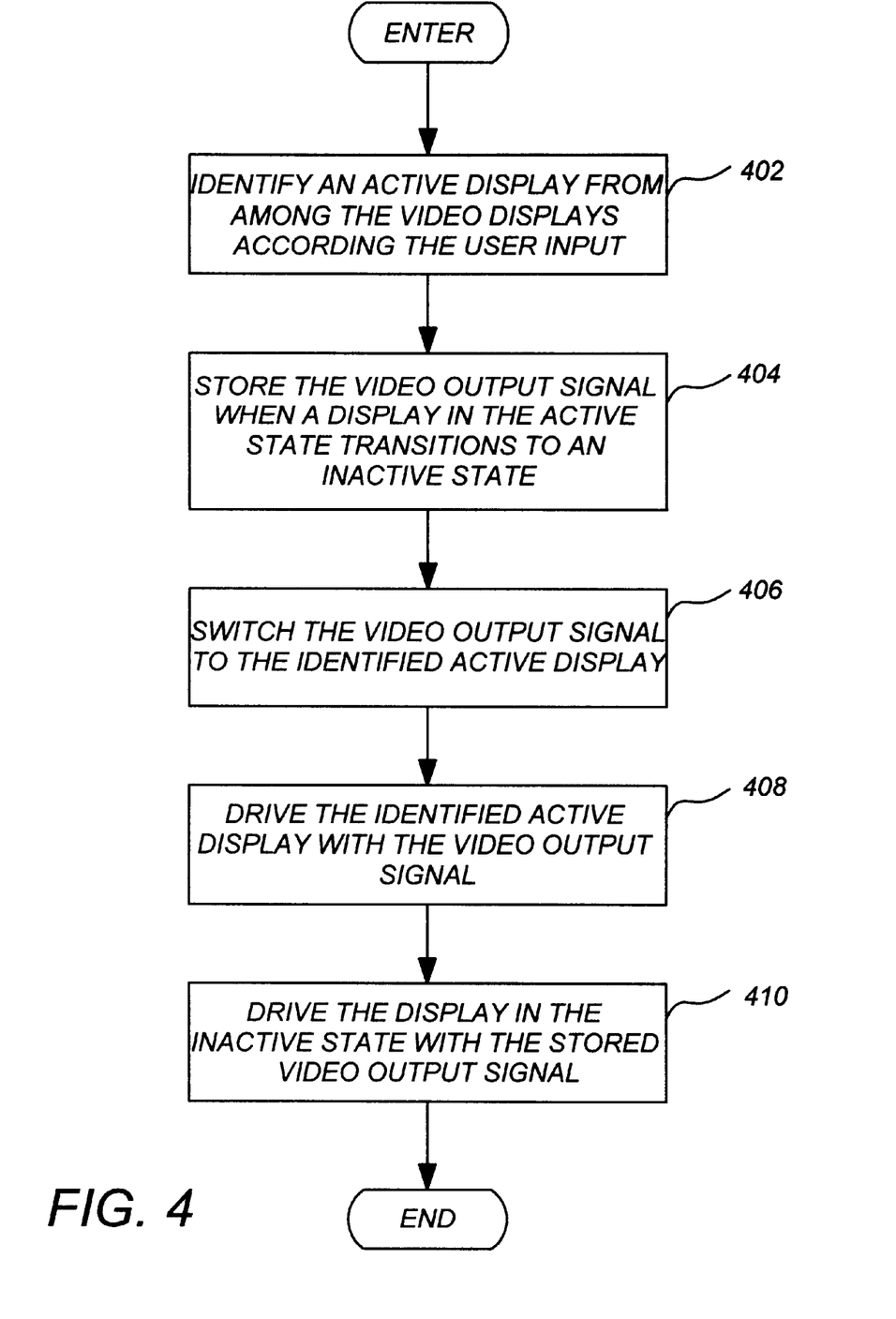
FIG. 4 is a flow chart describing exemplary method steps used to switch the video output signal from the computer to one of at least two video displays.

FIG. 4 is a flow chart describing exemplary method steps used to switch the video output signal from the computer to one of at least two video displays according to the intercepted user input. First, an active display is identified according to a user input from among the video displays 214. This is depicted in block 402. Display(s) 214 that are in an active state and commanded to transition to an inactive state then in block 404. The video output signal is switched to the identified active display, as shown in block 406. The active display is then driven with the video output signal, while the inactive displays are driven with the stored video output signal, as shown in blocks 408 and 410.

Figure 5:
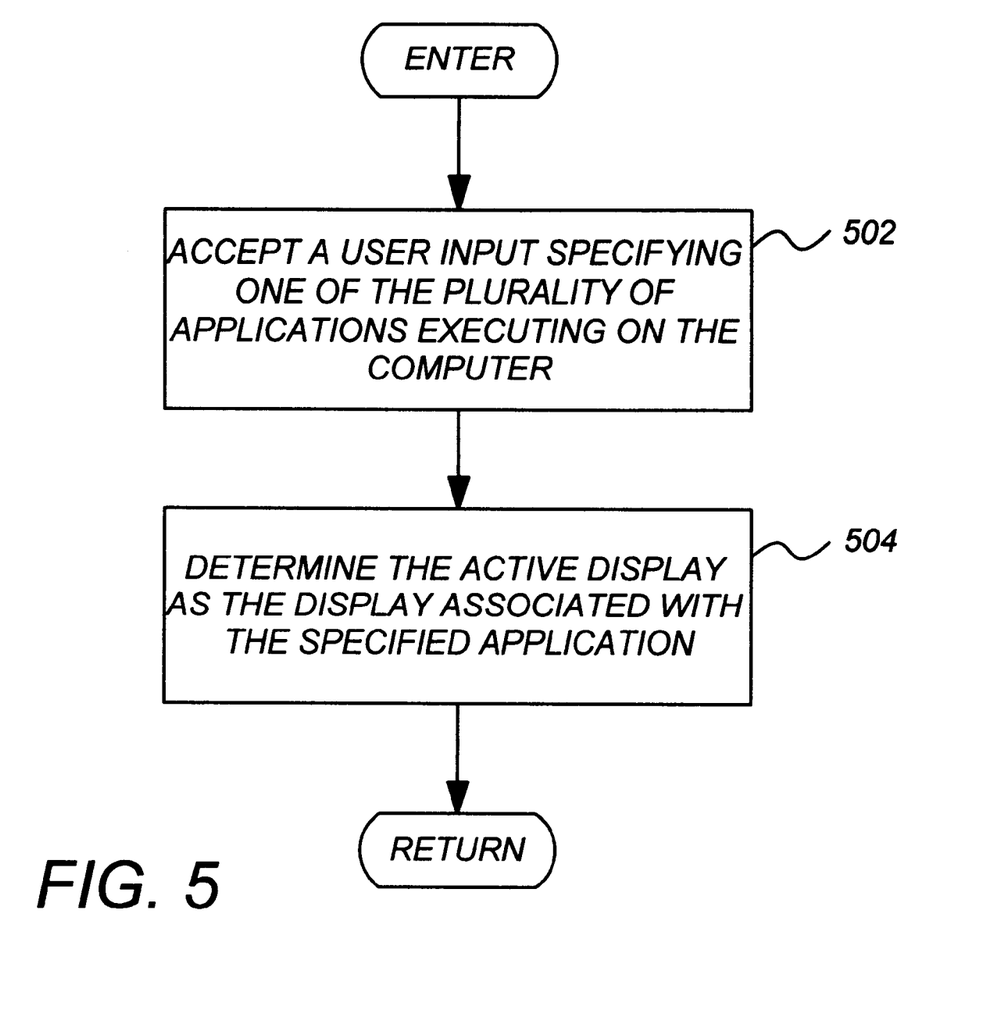
FIG. 5 is a flow chart describing exemplary method steps used to identify the display in the active display state from among the video displays.

FIG. 5 is a flow chart describing exemplary method steps used to identify the display in the active display state from among the video displays. First, a user input is accepted specifying one of the plurality of applications 110 executing on the computer 102, as shown in block 502. Then, the active display is determined 504 as the display 214 associated with the specified application. In another embodiment of the invention, the active display is identified by accepting a user input associated with a cursor, and identifying the active display as the display in which the cursor is disposed.

Conclusion

This concludes the description of the preferred embodiments of the present invention. In summary, the present invention describes a method and apparatus for adapting a single computer to drive at least two displays. In one embodiment, an apparatus for adapting a single computer to drive at least two displays is disclosed. The apparatus comprises a controller, coupled between a user input device such as a computer, the controller for providing a control signal according to a user input; and a video switcher, for selectively providing a signal from the computer to one of at least two video displays in response to the control signal. In another embodiment, a method of presenting information on at least two displays communicatively coupled to a computer is disclosed. The method comprises the steps of intercepting a user input to the computer, and directing a video output signal from the computer to one of at least two video displays according to the intercepted video input.

The foregoing description of the preferred embodiment of the invention has been presented for the purposes of illustration and description. It is not intended to be exhaustive or to limit the invention to the precise form disclosed. Many modifications and variations are possible in light of the above teaching. For example, this invention could be used for non-traditional desktop PC applications such as multi-screen kiosks, message boards, interactive white boards, and conference rooms. Further, the displays 214 need not be mounted in the same space to practice the present invention. Instead, they can be distributed around an office, auditorium, office building, or shop floor. This embodiment is useful when there is a need for networked monitors that are used to display output only (and do not accept input locally). Further, while the inactive displays were grayed, blurred, or otherwise altered to show the active displays, this need not be the case. If an indication of the inactivity of the display is not required, an unaltered frozen frame can be presented. Further, if desired, the microcontroller 206 can be used to drive the displays 214 in rapid sequence, giving an active appearance (and allowing data to be updated) in each. Finally, while the foregoing embodiment of the present invention discloses the use of two control signals from the controller 206, one for the video drivers 210, and one for the video switcher 204, a single control signal can be used to drive both the video switcher and the video drivers.

It is intended that the scope of the invention be limited not by this detailed description, but rather by the claims appended hereto. For example, while the foregoing discussion discloses common computer input devices such as a keyboard and mouse, other computer input devices such as digitizing tablet and joystick may be used without departing from the spirit of the invention. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for adapting a single computer to drive at least two displays, comprising:
    a controller, coupled between a user input device and the computer, the controller for providing a control signal according to a user input;
    a video switcher, for selectively providing a signal from the computer to one of at least two video displays in response to the control signal;
    a video module for each display, each video module comprising:
        a memory, for storing video data; and
        a driver, communicatively coupled to the controller, the memory, and the display, the driver for driving the video display using data selected from the memory and from the video switcher according to the control signal; and
    a second memory for storing output from the user input device and playing the output back to the computer while selectively providing the video data from the computer to the at least two video displays.

2. The apparatus of claim 1, wherein each of the displays are characterizable by an active state and an inactive state, and wherein the driver provides data from the video switcher to the memory if the display transitions from the active state to the inactive state.

3. The apparatus of claim 1, wherein each of the displays are characterizable by a state selected from a group comprising an active state and an inactive state, and the apparatus further comprises a video module for each display, each video module comprising:
    a memory, for storing video data when the display transitions from the active state to the inactive state; and
    a driver, communicatively coupled to the controller, the memory, and the display, for driving the video display using data selected from the memory when the display is in the inactive state and using data selected from the video switcher when the display is in the active state.

4. The apparatus of claim 3, wherein the state of each display is determined according the user input.

5. The apparatus of claim 4, wherein
    the user input specifies an annunciator location in a display space;
    each display presents a portion of the display space; and
    the controller generates a control signal to activate the display associated with the annunciator location in the display space.

6. The apparatus of claim 4, wherein the user input device is a pointing device and the user input specifies a location in one of the displays.

7. The apparatus of claim 4, wherein the user input device is a keyboard having a plurality of keys and the controller generates a control signal according to a selection of a key.

8. An apparatus for adapting a computer to drive a plurality of displays, wherein each display presents data from only one of a plurality of applications executing on the computer, the apparatus comprising:
    a controller, coupled between a user input device and the computer, the controller for providing a control signal according to an application selected by a user input;
    a video switcher, for selectively providing a signal having data from the selected application to one of at least two video displays in response to the control signal;
    a video module for each display, each video module comprising:
        a memory, for storing video data; and
        a driver, communicatively coupled to the controller, the memory, and the display, for driving the video display using data selected from the memory and from the video switcher according to the control signal;
    wherein each of the displays are characterizable by an active state and an inactive state selected by the user input, and wherein the driver transfers data to the memory when the display transitions from the active state to the inactive state.

9. The apparatus of claim 8, wherein the state of each display is determined according to the application selected by the user input.

10. A method of presenting information on at least two displays communicatively coupled to a computer, comprising the step of
    intercepting a user input to the computer; and
    directing a video output signal from the computer to one of at least two video displays according to the intercepted user input;
    storing the intercepted user input;
    providing the stored intercepted user input to the computer while directing the video output signal to one of at least two video displays according to stored intercepted user input;
    wherein each display is characterizable by a state selected from the group comprising an active state and an inactive state, and the step of directing a video output signal from the computer to one of at least two video displays according to the intercepted user input comprises the steps of:

identifying an active display from among the video displays according to the user input;

storing the video output signal when a display in the active state transitions to an inactive state;

switching the video output signal to the identified active display;

driving the identified active display with the video output signal; and driving the display in the inactive state with the stored video output signal.

11. The method of claim 10, wherein each of the displays is associated with only one of a plurality of applications executing on the computer, and the step of identifying the active display from among the video displays comprises the step of:

accepting a user input specifying one of the plurality of applications executing on the computer; and determining the active display as the display associated with the specified application.

12. The method of claim 11, wherein the user input is a keyboard input.

13. The method of claim 12, wherein the user input is a pointing device input.

14. An apparatus for presenting information on at least two displays communicatively coupled to a computer, comprising:

means for intercepting a user input to a computer; and means for directing a video output signal from the computer to one of at least two video displays according to the intercepted user input;

means for storing the intercepted user input;

means for providing the stored intercepted user input to the computer; and wherein each display is characterizable by a state selected from the group comprising an active state and an inactive state, and the means for directing a video output signal from the computer to one of at least two video displays according to the intercepted user input comprises:

means for identifying an active display from among the video displays according to the user input;

means for storing the video output signal when a display in the active state transitions to an inactive state;

means for switching the video output signal to the identified active display;

means for driving the identified active display with the video output signal; and means for driving the display in the inactive state with the stored video output signal.

15. The apparatus of claim 14, wherein each of the displays is associated with only one of a plurality of applications executing on the computer, and the means for identifying the active display from among the video displays comprises:

means for accepting a user input specifying one of the plurality of applications executing on the computer; and means for determining the active display as the display associated with the specified application.

16. An apparatus for adapting a single computer to drive at least two displays, comprising:

a controller, coupled between a user input device and the computer, the controller for providing a control signal according to a user input;

a video switcher, for selectively providing a signal from the computer to one of at least two video displays in response to the control signal;

a video module for each display, each video module comprising:

a memory, for storing video data; and a driver, communicatively coupled to the controller, the memory, and the display, the driver for driving the video display using data selected from the memory and from the video switcher according to the control signal; and wherein each of the displays are characterizable by an active state and an inactive state, and wherein the driver provides data from the video switcher to the memory if the display transitions from the active state to the inactive state.

17. The apparatus of claim 16, further comprising a second memory for storing output from the user input device and playing the output back to the computer while selectively providing the video data from the computer to the at least two video displays.

18. The apparatus of claim 16, wherein the state of each display is determined according the user input.

19. The apparatus of claim 18, wherein the user input specifies an annunciator location in a display space;

each display presents a portion of the display space; and the controller generates a control signal to activate the display associated with the annunciator location in the display space.

20. An apparatus for adapting a single computer to drive at least two displays, comprising:

a controller, coupled between a user input device and the computer, the controller for providing a control signal according to a user input;

a video switcher, for selectively providing a signal from the computer to one of at least two video displays in response to the control signal;

wherein each of the displays are characterizable by a state selected from a group comprising an active state and an inactive state, and the apparatus further comprises a video module for each display, each video module comprising:

a memory, for storing video data when the display transitions from the active state to the inactive state; and a driver, communicatively coupled to the controller, the memory, and the display, for driving the video display using data selected from the memory when the display is in the inactive state and using data selected from the video switcher when the display is in the active state.

21. The apparatus of claim 20, further comprising a second memory for storing output from the user input device and playing the output back to the computer while selectively providing the video data from the computer to the at least two video displays.

22. The apparatus of claim 20, wherein the state of each display is determined according the user input.

23. The apparatus of claim 22, wherein the user input specifies an annunciator location in a display space; each display presents a portion of the display space; and the controller generates a control signal to activate the display associated with the annunciator location in the display space.

* * * * *